F. SCHERLER AND J. LAMCHE.
HOTBED.
APPLICATION FILED OCT. 18, 1919.

1,410,036.

Patented Mar. 21, 1922.
3 SHEETS—SHEET 3.

Witnesses:
Emil Kayser
Robert Schaper

Inventors:
Fritz Scherler
Johann Lamche
by: Focke, Freeman,
Watson & Coit
Attorneys.

UNITED STATES PATENT OFFICE.

FRITZ SCHERLER AND JOHANN LAMCHE, OF BERLIN, GERMANY.

HOTBED.

1,410,036.

Specification of Letters Patent.   Patented Mar. 21, 1922.

Application filed October 18, 1919. Serial No. 331,729.

*To all whom it may concern:*

Be it known that we, FRITZ SCHERLER and JOHANN LAMCHE, citizens of Germany, and residents of Berlin, Germany, have invented new and useful Improvements in Hotbeds, (for which we have filed an application in Germany, October 24, 1917,) of which the following is a specification.

Our invention relates to hot-beds and more especially to the garden frames protecting same and its particular object is an arrangement whereby such garden frames can be lifted and lowered in an easy and convenient manner.

Up till now the garden frames covering the hot-beds used in horticultural establishments are lifted for the purpose of airing, watering and general handling of the plants by turning them about their longitudinal axis by hand. In the case where it is not desired to support the frames with the hand while working the soil and handling the plants, a wooden stay is generally placed underneath the frame. To say nothing of the trouble and loss of time occasioned thereby the lifting as well as the one-sided supporting of the frames causes an undue wear of the hinges connecting them with the ridge piece, the hinges being worn and getting unfit for further use in a relatively short time. The ridge piece itself is exposed to undue stresses by the alternate one-sided opening of the frames and the frames are permanently in danger of getting damaged on the stays being pushed aside by careless manipulating of the instruments used, such stays forming of themselves a great hindrance to a proper handling of the plants, instruments etc.

According to the present invention, now, these drawbacks are obviated in a simple, inexpensive and efficient manner by providing posts erected on the ridge of the hotbed, such posts serving as supports for raising devices of a suitable kind. Such posts may be disposed also on all existing hot beds, and with their aid either all the frames or those located on one side of the bed only, may be lifted simultaneously, a great saving of time and money being effected thereby. Furthermore the simultaneous lifting of the frames on both sides of the ridge results in a balance of forces which acts towards prolonging the life of the hot bed as a whole and rendering the working of it considerably safer.

In the drawings affixed to this specification and forming part thereof a hot bed with the preferred form of the improvement according to our invention applied to it is illustrated.

Figure 1:
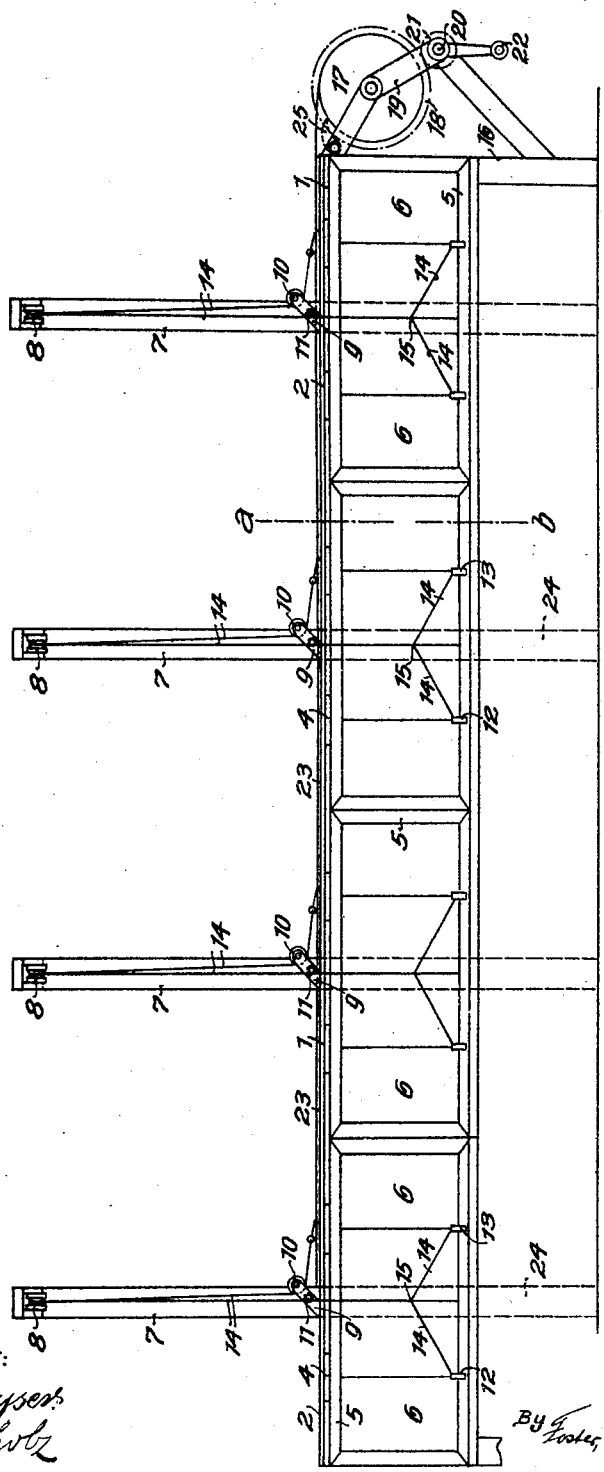
Fig. 1 is a side elevation showing the garden-frames in lowered position.
Figure 2:
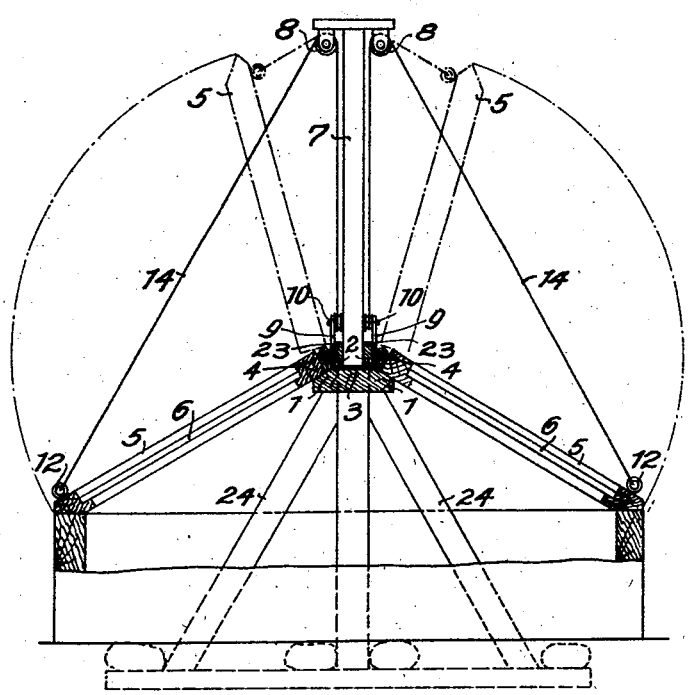
Fig. 2 is a vertical cross-section on the line a—b (Fig. 1).
Figure 3:
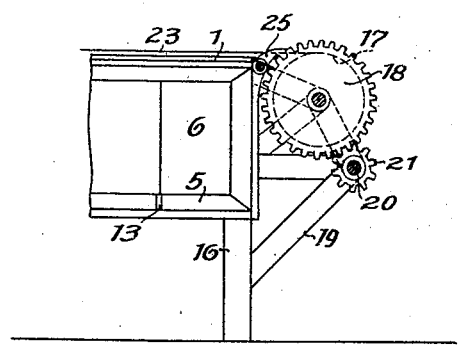
Figure 3 is a side elevation of the end of the frame showing the windlass mechanism, portions being omitted.
Figure 4:
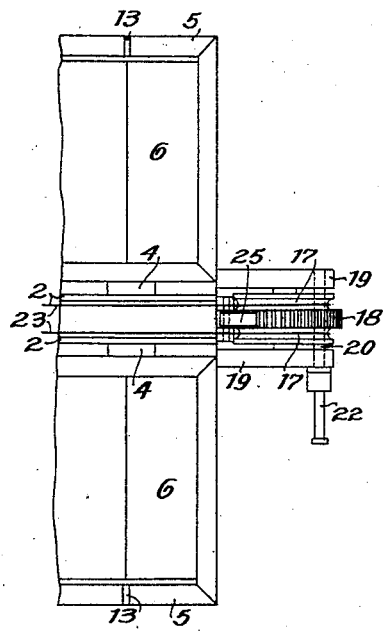
Figure 4 is a plan view of the same.

Referring to the drawings, 1 is a wooden ridge-piece of the hot bed and 3 is a U-iron fixed thereon with its flanges 2 directed upwards. 5 are the frames hinged to the flanges 2 of the U-iron by aid of hinges 4. Each frame comprises one or a plurality of glass panes 6 loosely disposed therein so as to be easily replaceable. 7, 7 are posts of suitable material extending through openings in the U-iron half way between the ends of each frame and fixed to the ridge piece 1 as well as to posts 24 projecting through the bottom of the hot bed and stayed in the ground by aid of struts which may be weighted, if necessary, with concrete blocks or the like. 8, 8 are sheaves disposed on the upper ends of said posts on both sides thereof. Near the point of fixation of the post 7 in the ridge piece 1 a yoke 9 is arranged on both sides of the post, said yoke embracing a bigger sheave 10 and a smaller sheave 11. The yoke is arranged at an angle of 45° relatively to the ridge piece. A cable, 14 is fixed to the free edge of each frame 5 in two points 12, 13, its ends united at 15 running over the sheave 8 and downwards over the bigger sheave 10 of the yoke 9. On each side of the pillars 7 a main cable 23 is arranged in such a manner as to glide in the channel or U-iron 3, the single cables 14 being connected therewith. Other cables, fastened to the free ends of the cable 23 are removably connected with drums 17 arranged on the front wall 16 of the hot bed. A toothed wheel 18 in gear with a pawl is provided between said drums and may be integral therewith. The struts 19 carrying the toothed wheel 18 also serve as bearings for the axle 20 of a small toothed wheel 21 in gear therewith. A hand crank 22 on said axle serves for actuating the wheels 21, 18 and for lifting thereby the frames on both sides of the posts 7, 7, or only those on one side, all wires, cables for lifting the frames on one side being connected with their respective main cables which are connected in their turn with the drums 17 which may be singly thrown out of operation and may be locked in such thrown-out position. In consequence of this arrangement, whenever only the frames on one side of the ridge piece are lifted, every tendency to bend of the pillars will cause the frames on the other side, which were closed until then, to be lifted from their seats also, so that even in this case all the frames are counterbalanced. The little sheaves 11 of the yokes 9 serve as guides for the cables.

We wish it to be understood that we do not desire to be limited to the exact details of construction shown and described, for obvious modifications will occur to any person skilled in the art.

We claim:—

1. In a hot-bed, in combination, a ridge piece, a frame on each side of said ridge piece and hinged thereto and means for raising or lowering said frames simultaneously, said means including a post mounted on the ridge piece and having pulleys supported on the upper end thereof, a windlass mechanism at the end of the ridge piece, and flexible members each having one end secured to the windlass mechanism and the other end secured to the free edge of a frame and each passing over one of the pulleys supported on the post.

2. In a hot-bed in combination, a ridge piece extending longitudinally of said hot-bed, a row of garden frames hinged to each side of said ridge piece, a post on said ridge between each pair of frames, raising means secured to the free edges of said frames, a U-iron on said ridge piece, traction means disposed on said U-iron connected to said raising means and a windlass mechanism connected with the said traction means arranged at the front wall of said hot-bed.

In witness whereof we have hereunto set our hand in the presence of witnesses.

FRITZ SCHERLER.

Witnesses as to Fritz Scherler:
ANNA ZGODDA GEB. FLEISCHMANN,
PETER KRUM.

JOHANN LAMCHE.

Witnesses as to Johann Lamche:
ANNA ZGODDA GEB. FLEISCHMANN,
PETER KRUM.